United States Patent [19]

Sugiyama

[11] Patent Number: 5,850,259
[45] Date of Patent: Dec. 15, 1998

[54] PREDICTIVE CODING APPARATUS

[75] Inventor: Kenji Sugiyama, Yokosuka, Japan

[73] Assignee: Victor Company of Japan, Ltd., Yokohama, Japan

[21] Appl. No.: 857,488

[22] Filed: May 16, 1997

Related U.S. Application Data

[62] Division of Ser. No. 396,226, Feb. 28, 1995, Pat. No. 5,680,174.

[30] Foreign Application Priority Data

Feb. 28, 1994 [JP] Japan .................................. 6-055148

[51] Int. Cl.$^6$ ...................................................... H04N 7/50
[52] U.S. Cl. ........................... 348/405; 348/409; 348/420
[58] Field of Search ..................... 348/384, 390, 348/400–405, 409–412, 415, 420; 382/232, 236, 238, 248, 250; H04N 7/130, 7/133, 7/137

[56] References Cited

U.S. PATENT DOCUMENTS

| | | | |
|---|---|---|---|
| 4,679,081 | 7/1987 | Tsugane et al. | 348/409 |
| 4,785,356 | 11/1988 | Gonzales et al. | 348/409 |
| 4,953,024 | 8/1990 | Caronna | 348/409 |
| 5,043,809 | 8/1991 | Shikakura et al. | 348/409 |
| 5,046,071 | 9/1991 | Tanoi | 348/415 |
| 5,237,410 | 8/1993 | Inoue | 348/409 |
| 5,327,173 | 7/1994 | Nishizawa et al. | 348/412 |
| 5,333,012 | 7/1994 | Singhal et al. | 348/405 |
| 5,469,213 | 11/1995 | Koga et al. | 348/405 |
| 5,543,843 | 8/1996 | Kato et al. | 348/405 |
| 5,598,213 | 1/1997 | Chung et al. | 348/405 |
| 5,638,126 | 6/1997 | Lim | 348/405 |
| 5,646,689 | 7/1997 | Ostermann | 348/405 |
| 5,699,119 | 12/1997 | Chung et al. | 348/405 |
| 5,703,652 | 12/1997 | Kondo et al. | 348/405 |

OTHER PUBLICATIONS

ISO/IEC 11172–2 (Aug. 1, 1993), Information Technology—Coding of Moving Pictures and Associated Audio for Digital Storage Media Up To About 1,5 Mbit/s—Part 2: Video.

*Primary Examiner*—Richard Lee
*Attorney, Agent, or Firm*—Jacobson, Price, Holman & Stern, PLLC

[57] ABSTRACT

A predictive coding apparatus encodes an input video signal. A prediction error signal of the input video signal is generated by at least another video signal which is coded before or after the input video signal. The prediction error signal is translated into codes of a fixed length with a predetermined quantizing step width. Activity of the prediction error signal is detected and compared with a reference value which depends on the quantizing step width. The codes of the fixed length or predetermined codes of zero values are selected per pixel block in accordance with the comparison result, the selected codes being used as the coded other video signal. The selected codes are translated into codes of variable lengths which are outputted as a coded video signal. Detected instead of the activity may be the maximum value and the number of non-zero values per pixel block of the codes of the fixed length or the maximum value per pixel block and the sum of the maximum values in pixel blocks of the codes of the fixed length which are compared with different reference values.

2 Claims, 4 Drawing Sheets

| DC | 1 | 0 | 0 | 0 | 0 | 0 | 0 | 0 |
|----|---|---|---|---|---|---|---|---|
|    | 0 | 0 | 0 | -2| 0 | 0 | 0 | 0 |
|    | 0 | 0 | 0 | 0 | 0 | 0 | 0 | 0 |
|    | -1| 0 | 0 | 0 | 0 | 0 | 0 | 0 |
|    | 0 | 0 | 1 | 0 | 0 | 0 | 0 | 0 |
|    | 0 | 0 | 0 | 0 | 0 | 0 | 0 | 0 |
|    | 0 | 0 | 0 | 0 | 0 | 0 | 0 | 0 |
|    | 0 | 0 | 0 | 0 | 0 | 0 | 0 | 0 |

FIG. 2A

| DC | 2 | -3| 0 | 0 | 0 | 0 | 1 | 0 |
|----|---|---|---|---|---|---|---|---|
|    | 0 | 0 | -2| 1 | 0 | 0 | 0 | 0 |
|    | -1| 0 | 0 | 0 | 0 | 0 | 0 | 0 |
|    | 0 | 0 | 2 | 0 | 0 | 0 | 0 | 0 |
|    | 0 | 0 | 0 | 0 | 0 | 0 | 0 | 0 |
|    | 0 | 1 | 0 | 0 | 0 | 0 | 0 | 0 |
|    | 0 | 0 | 0 | 0 | 0 | 0 | 0 | 0 |
|    | 0 | 0 | 0 | 0 | 0 | 0 | 0 | 0 |

FIG. 2B

PREDICTIVE CODING APPARATUS

This is a divisional of application Ser. No. 08/396,226, filed Feb. 28, 1995 now U.S. Pat. No. 5,680,174.

BACKGROUND OF THE INVENTION

This invention relates to an efficient coding apparatus which digitizes image information with less amount of data by interframe/interfield prediction in a system for recording, reproducing and displaying image information.

It is well known to make prediction between images utilizing high colleration of frame or field images in motion picture effective predictive coding.

In this well known apparatus, prediction error produced by means of two video signals is transformed by Discrete cosine transform (DCT) and quantized. The quantized fixed length code (prediction error) is coded into variable length code which is outputted from the apparatus.

The variable length coding is conducted such that variable length coding of zero runlength is applied to the quantized prediction error. The smaller the number of non-zero values per pixel block, the longer the zero runlength and code length. This feature of the variable length coding has not been applied to the conventional apparatus and hence coding has been ineffective.

SUMMARY OF THE INVENTION

A purpose of the invention is to provide a predictive coding apparatus of high coding efficiency with consideration of activity of a prediction error signal or the number of non-zero values of a quantized signal.

The present invention provides a predictive coding apparatus which comprises: first signal generating means for generating a prediction error signal of an input video signal by means of at least another video signal which is coded before or after the input video signal; first coding means for translating the prediction error signal into codes of a fixed length with a predetermined quantizing step width; detecting means for detecting activity of the prediction error signal; second signal generating means for generating a control signal by comparing the detected activity with a reference value which depends on the quantizing step width; selecting means, responsive to the control signal, for selecting the codes of the fixed length or predetermined codes of zero values, the selected codes being fed, as the coded other video signal, to the first signal generating means; and second coding means for translating the selected codes into codes of variable lengths which are outputted as a coded video signal.

The second signal generating means may feed the control signal to the selecting means so that the selecting means selects the codes of the zero values when the detected activity is equal to or smaller than the reference value.

Further, the present invention provides a predictive coding apparatus which comprises: first signal generating means for generating a prediction error signal of an input video signal by means of at least another video signal which is coded before or after the input video signal; first coding means for translating the prediction error signal per predetermined pixel block into codes of a fixed length with a predetermined quantizing step width; detecting means for detecting the maximum value and the number of non-zero values per pixel block of the codes of the fixed length; second signal generating means for generating a control signal by comparing the detected number and maximum value with predetermined first and second reference values, respectively; selecting means, responsive to the control signal, for selecting the codes of the fixed length or predetermined codes of zero values, the selected codes being fed, as the coded other video signal, to the first signal generating means; and second coding means for translating the selected codes into codes of variable lengths which are outputted as a coded video signal.

The second signal generating means may feed the control signal to the selecting means so that the selecting means selects the codes of the zero values when the detected number and maximum value are equal to or smaller than the first and second reference values, respectively.

The present invention further provides a predictive coding apparatus which comprises: first signal generating means for generating a prediction error signal of an input video signal by means of at least another video signal which is coded before or after the input video signal; first coding means for translating the prediction error signal per predetermined pixel block into codes of a fixed length with a predetermined quantizing step width; detecting means for detecting the maximum value per pixel block and the sum of maximum values of a predetermined number of pixel blocks of the codes of the fixed length; second signal generating means for generating a control signal by comparing the detected sum and maximum value with predetermined first and second reference values, respectively; selecting means, responsive to the control signal, for selecting the codes of the fixed length or predetermined codes of zero values, the selected codes being fed, as the coded other video signal, to the first signal generating means; and second coding means for translating the selected codes into codes of variable lengths which are outputted as a coded video signal.

The second signal generating means may feed the control signal to the selecting means so that the selecting means selects the codes of the zero values when the detected sum and maximum value are equal to or smaller than the first and second reference values, respectively.

BRIEF DESCRIPTION OF DRAWINGS

FIGS. 2A and 2B are illustrations to explain quantized DCT coefficients;

DETAILED DESCRIPTION OF PREFERRED EMBODIMENTS

Preferred embodiments of the present invention will be described with reference to the drawings.

Figure 1:
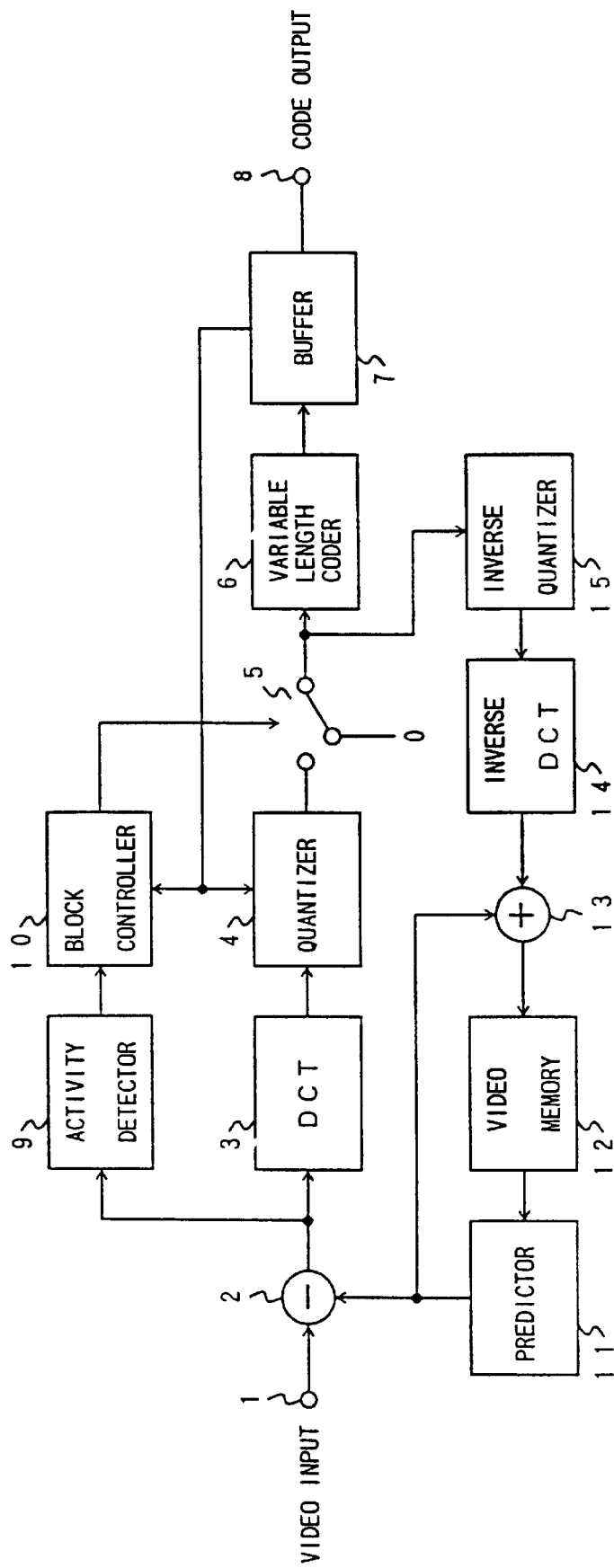
FIG. 1 is a block diagram of the first preferred embodiment of a predictive coding apparatus according to the present invention.

In FIG. 1 showing the first preferred embodiment, a video signal inputted via an input terminal 1 is fed to a prediction subtractor 2 that subtracts a prediction signal given by a predictor 11 from the input video signal to produce a prediction error signal.

The prediction error signal is fed to a discrete cosine transformer (DCT) 3 that applies discrete cosine transform to the prediction error signal per block of 8×8 pixels to produce transformed prediction error signal (DCT coefficients).

The DCT coefficients are fed to a quantizer 4 and quantized with a step width that depends on memory sufficiency of a buffer 7, to be fixed length codes. The fixed length codes of DCT coefficients are fed to a selector 5.

FIGS. 2A and 2B show examples of quantized DCT coefficients. When there are few non-zero values as shown in FIG. 2A, the values of zero runlength are 0, 8, 3 and 9 and then the average value is 5. On the other hand, when there are many non-zero values as shown in FIG. 2B, the values of zero runlength are 0, 0, 1, 3, 5, 4, 3, 4 and then the average value is 2.5. The DCT coefficients of longer average length shown in FIG. 2A have a larger amount of codes per non-zero value than that of the DCT coefficients shown in FIG. 2B.

The prediction error signal from the prediction subtractor 2 is further fed to an activity detector 9. The detector 9 detects, as activity, the standard deviation, etc., of the prediction error signal per pixel block (DCT block) and the detected activity is fed to a block controller 10.

The controller 10 compares the activity and a reference value that depends on the quantization step width information given by the buffer 7 and produces a control signal. The wider the width information the larger the reference value.

In response to the control signal, the selector 5 selects codes of zero values fed from a generator (not shown) if the activity is equal to or smaller than the reference value and, if not, selects the codes of the quantized prediction error signal.

In this embodiment, the selector 5 conducts selection per DCT block. The selection can also be made per macro block, that is, the activity detection and block control may be conducted per macro block with a reference value corresponding to the macro block. However, the macro block treatment may neglect relatively large prediction error if only the activity of a specific DCT block is large. In such a case, the activity detection may be conducted per DCT block as described above and the codes of zero values may be selected only when the activity of all DCT blocks of the macroblock are equal to or smaller than the reference value corresponding to the macro block.

The codes selected by the selector 5 are fed to a variable length coder 6 that encodes the codes into variable length codes (compressed codes). The variable length coder 6 zigzag-scans the two-dimensionally aligned codes produced by the DCT 3, converts the codes into one-dimensionally aligned codes and encodes the non-zero values and the zero runlength of zero values with Huffman codes. The Huffman codes are generated according to a generating frequency of its information source. The smaller the non-zero values and zero runlength the shorter the length of the Huffman codes. This is also the same as the two-dimensional Huffman codes of non-zero values and zero runlength.

The variable length codes generated by the variable length coder 6 are fed to the buffer 7 that absorbs variation of the codes generated due to the variable length coding and outputs the variable length codes with a constant transfer rate via a code output terminal 8. The buffer 7 further generates the quantization step width information for the constant transfer rate which is fed to the quantizer 4 and block controller 10.

The codes selected by the selector 5 are also fed to an inverse quantizer 15 and replaced with representative values. These values are fed to an inverse DCT 14 that transforms the values, the transformation being inverse of the transformation performed by the DCT 3, to reproduce the predictive error signal.

The reproduced predictive error signal is fed to an adder 13 that adds the prediction signal given by the predictor 11 and the predictive error signal to reproduce the video signal.

The reproduced video signal is stored into a video memory 12 as an image for prediction. The stored video signal is fed to the predictor 11 that produces the prediction signal which is fed to the prediction subtractor 2 and adder 13.

The motion compensation is conducted per macro block of 16×16 pixels made of two DCT blocks connected to each other.

Figure 3:
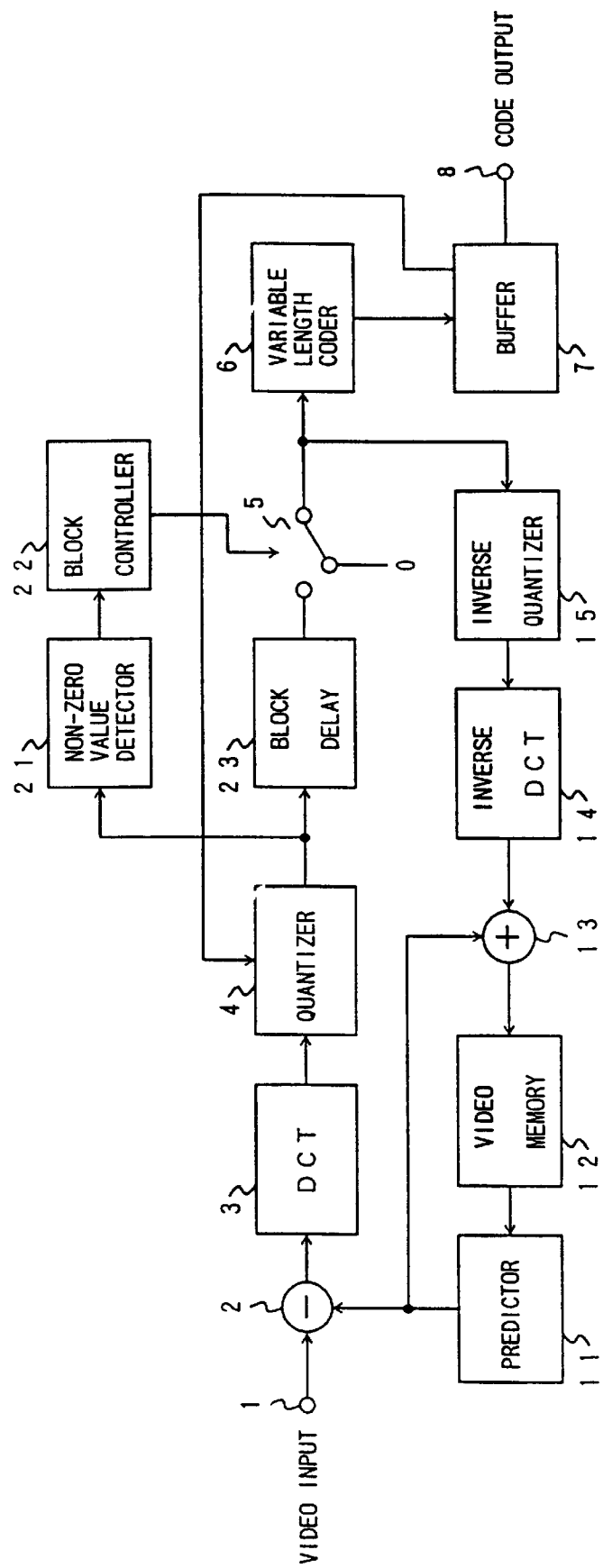
FIG. 3 is a block diagram of the second preferred embodiment of a predictive coding apparatus according to the present invention.

Next, the second preferred embodiment shown in FIG. 3 is different from the first preferred embodiment of FIG. 1 in that the former provides a non-zero value detector 21, a block controller 22 and a block delay 23.

A video signal inputted via an input terminal 1 is fed to a subtractor 2, DCT 3 and quantizer 4 to be quantized DCT coefficients the same as described in the first embodiment. The quantized DCT coefficients are fed to the non-zero value detector 21 and block delay 23.

The non-zero value detector 21 detects the maximum value of the absolute values and the number of non-zero values per DCT block and feeds them to the block controller 22.

The block controller 22 compares the maximum value and the number of the non-zero values with a first reference value L for the maximum value and a second reference value N for the number of non-zero values per DCT block, respectively and produces and feeds a first control signal to a selector 5.

In response to the first control signal, the selector 5 selects codes of zero values fed by a generator (not shown) if the maximum value and the number of non-zero values are equal to or smaller than the first and second reference values L and N, respectively, and if not, selects the codes of the predictive error signal which are fed from the quantizer 4 via the block delay 23. The block delay 23 delays the codes of the predictive error signal by a period of time corresponding to a pixel block selected by the selector 5 at a time.

Or, the non-zero value detector 21 detects the maximum value of the absolute values and the sum of the absolute values per DCT block and feeds them to the block controller 22. The block controller 22 compares the maximum value and the sum of the absolute values with the first reference value L and a third reference value S, respectively, and produces and feeds a second control signal to the selector 5.

In response to the second control signal, the selector 5 selects the codes of the zero values if the maximum value per DCT block and the sum are equal to or smaller than the first and third reference values L and S, and if not, selects the codes of the predictive error signal fed via the block delay 23.

The first, second and third reference values L, N and S are predetermined values and are for example, 2, 4 and 6, respectively, when the quantized DCT values are 0, ±1, ±2, . . . .

In this embodiment, the selector 5 conducts selection per DCT block. The selection can also be made per macro block. In this case, the non-zero value detection and block control may be conducted per macro block with the reference values, such as N and S corresponding to the macro block. Further, the non-zero value detection and block control may be conducted per DCT block as described above and the codes of the zero values may be selected per macro block only when zero values of all DCT blocks of the macroblock are selected.

In response to the first or second control signal, the selector 5 selects the codes of the predictive error signal or the zero values and feeds the selected codes to a variable length coder 6 and an inverse quantizer 15.

The remaining process of treating the selected codes in the second preferred embodiment is the same as that described with respect to the first preferred embodiment and hence its description is omitted here.

In the first and second embodiments, the prediction for producing the predictive error signal may be one-direction prediction using two sequential images or bi-direction prediction for MPEG (Moving Picture Image Coding Experts Group) method using two images coming before and after the image to be predicted. This bi-directional prediction is especially applicable to the present invention because it produces little prediction error.

Figure 4:
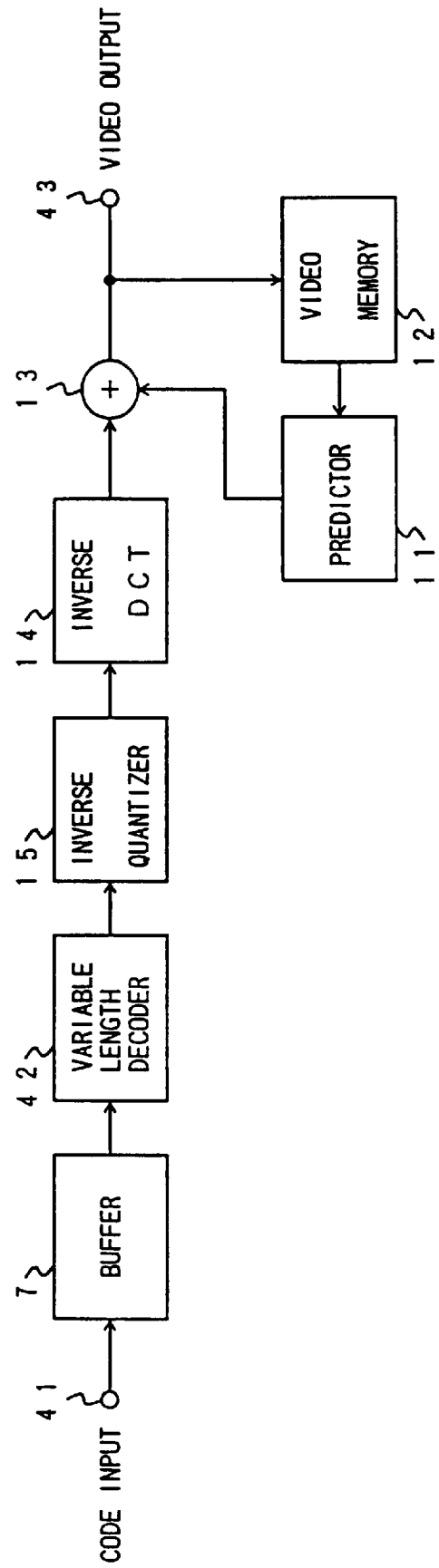
FIG. 4 is a block diagram of a decoding apparatus.

FIG. 4 shows a decoding apparatus that accepts the codes (video data) fed from the predictive coding apparatus of FIGS. 1 or 3.

The codes of variable length inputted via a code input terminal 41 are fed to a variable length decoder 42 via a buffer 7 and is decoded into codes of fixed length. The fixed length codes are fed to an inverse quantizer 15 that produces quantized representative values.

The quantized representative values are fed to an inverse DCT 14 that transforms the values, the transformation being inverse of the transformation performed by the DCT 3 of FIG. 1, to reproduce the predictive error signal. The reproduced signal is fed to an adder 13 and added to a prediction signal given by a predictor 11, to reproduce a video signal which is outputted via a video output terminal 43 and also stored into a video memory 12 as an image for prediction. The stored video signal is fed to the predictor 11 that produces the predictive signal which is fed to the adder 13.

As described above, the predictive coding apparatus of the present invention provides a short average zero run-length and a short average code length per non-zero coefficient by way of obtaining the activity of prediction error and the number of non-zero values of quantized codes per pixel block and replacing all codes of a pixel block of few number of non-zero values with zero values.

Further, the predictive coding apparatus of the present invention provides few block data, such as EOB (End of Block) due to replacement of all codes of a pixel block of few number of non-zero values with zero values and hence provides high coding efficiency.

Further, the predictive coding apparatus of the present invention does not generate mosquito noise in a pixel block in which prediction error is not coded, even though there is much prediction error remaining. Particularly, in a pixel block in which prediction error is coded, the predictive coding apparatus of the present invention produces a lot of codes with little noise, thus reducing mosquito noise. This improves image quality from a user's point of view.

What is claimed is:

1. A predictive coding apparatus comprising:

prediction means for generating a prediction error signal of an input video signal by means of at least another video signal which is coded before or after the input video signal;

transforming means for transforming the prediction error signal per predetermined pixel block and producing a transformed prediction error signal;

quantizing means for quantizing the transformed prediction error signal with a predetermined quantizing step width and outputting quantized codes of a fixed length;

detecting means for detecting the maximum value of absolute values per pixel block and the sum of the absolute values per pixel block of the quantized codes of the fixed length;

control signal generating means for generating a control signal by comparing the detected sum and maximum value with predetermined first and second reference values, respectively;

selecting means, responsive to the control signal, for selecting the quantized codes of the fixed length or predetermined codes of zero values per pixel block, the selected codes being fed, as said at least another video signal, to the prediction means; and coding means for encoding the selected codes into codes of variable lengths which are outputted as a coded video signal.

2. An apparatus according to claim 1, wherein the control signal generating means feeds the control signal to the selecting means so that the selecting means selects the codes of the zero values when the detected sum and maximum value are equal to or smaller than the first and second reference values, respectively.

* * * * *